United States Patent
Katogi et al.

[11] Patent Number: 5,945,828
[45] Date of Patent: Aug. 31, 1999

[54] ENGINE COMBUSTION CONDITION DETECTING APPARATUS EQUIPPED WITH MALFUNCTION DIAGNOSING APPARATUS

[75] Inventors: Kozo Katogi, Hitachi; Toshio Ishii; Yutaka Takaku, both of Mito, all of Japan

[73] Assignee: Hitachi, Ltd., Tokyo, Japan

[21] Appl. No.: 09/042,558

[22] Filed: Mar. 17, 1998

[30] Foreign Application Priority Data

Mar. 17, 1997 [JP] Japan .................................. 9-063474

[51] Int. Cl.$^6$ ............................ F02P 17/00; G01M 15/00
[52] U.S. Cl. ..................... 324/399; 324/388; 73/117.3; 123/406.27
[58] Field of Search ..................... 324/378, 384, 324/388, 399, 459; 73/116, 117.3, 118.1; 123/406.26, 406.27

[56] References Cited

U.S. PATENT DOCUMENTS

| | | | |
|---|---|---|---|
| 5,309,884 | 5/1994 | Fukui et al. | 324/388 |
| 5,392,641 | 2/1995 | McCombie | 73/117.3 |
| 5,425,339 | 6/1995 | Fukui | 123/406.27 |
| 5,606,120 | 2/1997 | Daicho et al. | 73/117.3 |
| 5,755,206 | 5/1998 | Takahashi et al. | 123/406.27 |
| 5,775,298 | 7/1998 | Haller | 73/116 |

FOREIGN PATENT DOCUMENTS 4-308360  10/1992  Japan .

*Primary Examiner*—Diep Do
*Attorney, Agent, or Firm*—Evenson, McKeown, Edwards & Lenahan, PLLC

[57] ABSTRACT

A failure of a detecting circuit such as an ion current detecting circuit for detecting a combustion condition of an engine can be diagnosed at a stage for detecting a combustion condition by a combustion condition detecting apparatus equipped with a malfunction diagnosing apparatus. The engine combustion condition detecting apparatus equipped with the malfunction diagnosing apparatus is arranged by a sensing circuit for sensing an ion current flowing through a combustion chamber, a misfire judging means for judging misfire occurred in the engine in response to the detection signal derived from the sensing circuit, and a malfunction judging means for judging malfunction of the sensing circuit.

5 Claims, 10 Drawing Sheets

FIG. 5

| MULFUNCTION SUBJECT | MISFIRE DETECTION |
|---|---|
| CHARGE CAPACITOR IS OPENED | NORMAL IGNITION IS RECOGNIZED AS MISFIRE |
| ZENOR DIODE IS OPENED | MISFIRE IS RECOGNIZED AS NORMAL IGNITION |
| ZENOR DIODE IS SHORT-CIRCUITED, OR CHARGE CAPACITOR IS SHORT-CIRCUITED | NORMAL IGNITION IS RECOGNIZED AS MISFIRE |
| DIODE IS OPENED | MISFIRE IS RECOGNIZED AS NORMAL IGNITION |
| RESISTOR IS OPENED | DEPENDING ON THRESHOLD VALUE, MISFIRE IS RECOGNIZED AS NORMAL IGNITION, AND NORMAL IGNITION IS RECOGNIZED AS MISFIRE |
| DIODE OR RESISTOR IS SHORT-CIRCUITED | NORMAL IGNITION IS RECOGNIZED AS MISFIRE |
| VB SHORT-CIRCUIT OF SECONDARY WINDING TERMINAL OF IGNITION COIL | NORMAL IGNITION IS RECOGNIZED AS MISFIRE |
| GROUND SHORT-CIRCUIT OF SECONDARY WINDING TERMINAL OF IGNITION COIL | NORMAL IGNITION IS RECOGNIZED AS MISFIRE |
| HARNESS BETWEEN MODULE AND CONROL UNIT IS OPENED | NORMAL IGNITION IS RECOGNIZED AS MISFIRE |
| HARNESS BETWEEN IGNITION COIL AND MODULE IS OPENED | NORMAL IGNITION IS RECOGNIZED AS MISFIRE |
| SECONDARY WINDING TERMINAL OF IGNITION COIL IS OPENED | MISFIRE ACTUALLY OCCURS DUE TO THIS MULFUNCTION, AND CONTROL UNIT JUDGES THAT IT IS "MISFIRE" |

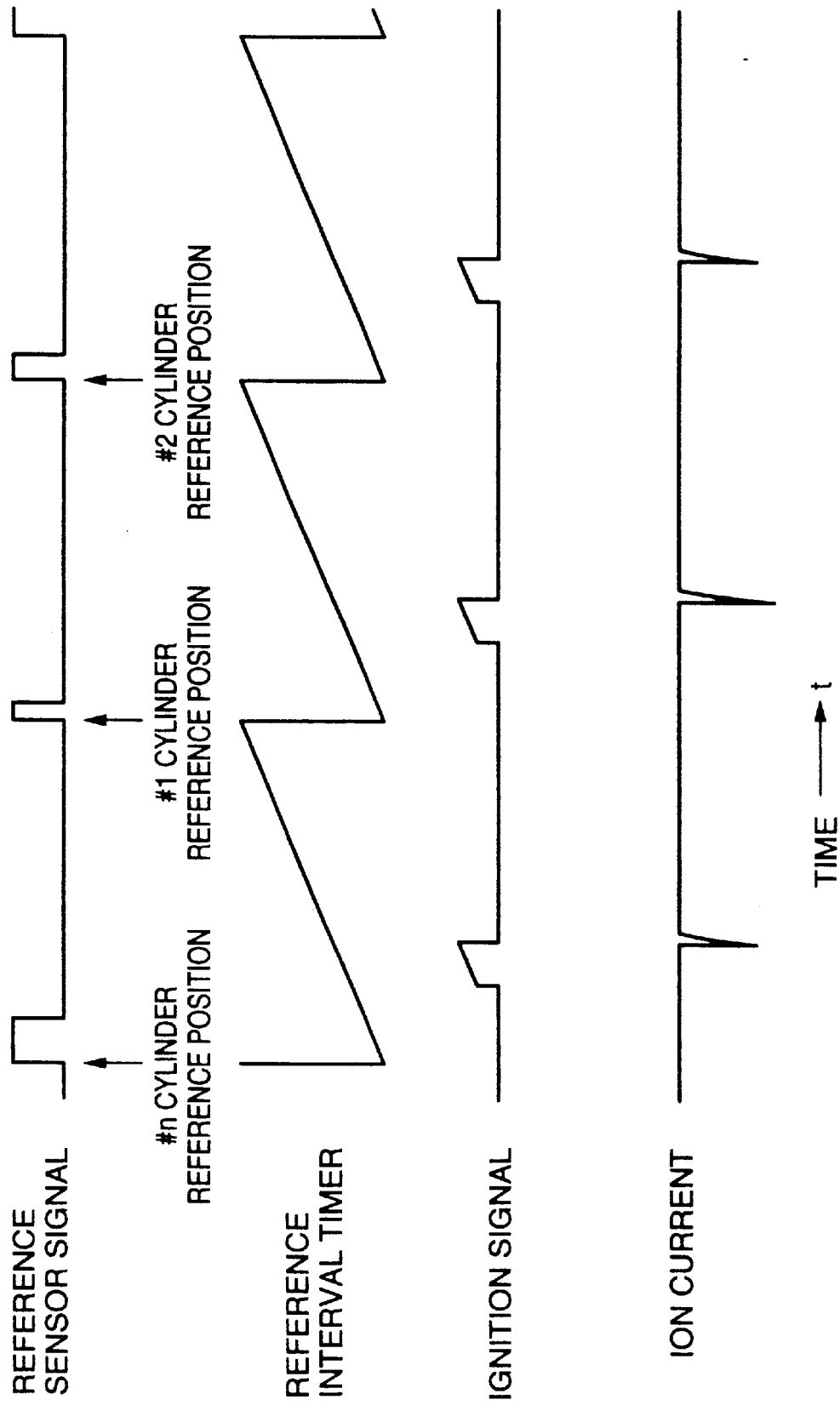

FIG. 10

| ELEMENT | OPEN IN ELEMENT | SHORT CIRCUIT IN ELEMENT |
|---|---|---|
| CHARGE CAPACITOR | ION CUREENT, 901, INTERRATED VALUE — JUDGED AS MISFIRE EVEN IN NORMAL | 902, INTEGRATED VALUE — NO TRIGGER |
| ZENOR DIODE | ION CURRENT, 903, JUDGED AS NORMAL EVEN IN MISFIRE | ION CURRENT, 904, INTEGRATED VALUE — NO TRIGGER |
| DIODE | ION CURRENT, 905, INCREASE INTEGRATED VALUE | ION CURRENT=0A, 906, INTEGRATED VALUE=0V |
| CURRENT DETECTING RESISTOR | ION CURRENT, 907, INCREASE INTEGRATED VALUE | ION CURRENT=0A, 908, INTEGRATED VALUE=0V |

ENGINE COMBUSTION CONDITION DETECTING APPARATUS EQUIPPED WITH MALFUNCTION DIAGNOSING APPARATUS

BACKGROUND OF THE INVENTION

The present invention generally relates to an engine combustion condition detecting apparatus equipped with a malfunction (failure) diagnosing apparatus. More specifically, the present invention is directed to such an engine combustion condition detecting apparatus equipped with a malfunction diagnosing apparatus, capable of preventing an erroneous diagnosis of engine combustion conditions caused by malfunctions of this engine combustion condition detecting apparatus.

To detect a combustion condition of an engine, it is important to judge as to whether this combustion condition is under normal condition, or under misfire condition. Conventionally, as an apparatus for detecting a combustion condition, a combustion pressure sensor is used to detect pressure within a combustion chamber. However, since this combustion pressure sensor is expensive, this sensor could not be mounted on each of cylinders due to high cost reason. Accordingly, this combustion pressure sensor is installed only on a specific cylinder to measure combustion pressure thereof. Then, the combustion conditions of the engine are detected by this measured combustion pressure.

Also, to judge an occurrence of misfire in an engine, a torque variation of this engine is acquired as a change in the number of revolutions, and a fluctuation in the engine speed is detected. In this case, an error is produced in the variation of the engine speed unless disturbance is removed based on drive condition. Thus, there is a risk that the fluctuation is erroneously detected.

Under such a circumstance, the following detecting technique has been proposed in which since the combustion conditions within the combustion chambers of the engine are directly detected, the combustion conditions of the engine and the misfire condition are detected. In other words, this conventional detecting technique is performed by measuring the amount of ions contained in the combustion gas within the combustion chambers by way of the ion current detecting means. The combustion conditions of the engine can be directly detected by using this conventional detecting technique without detecting the change of the engine speed, while considering the disturbance and the combustion pressure sensor.

Japanese patent application Un-examined Publication No. JP-A-4-308360 discloses the engine combustion condition detecting apparatus with employment of the above-explained ion current detecting means.

On the other hand, this proposed combustion condition detecting apparatus is arranged by the ion current detecting circuit for detecting the ion currents produced by the combustion within the respective cylinders of the engine, and also the judging means for judging as to whether the internal condition of the cylinder during the ignition operation is under normal combustion, or under misfire condition by using the ion current signal outputted from this ion current detecting circuit. This ion current detecting circuit means is inserted into the conventional ignition circuit. There is no problem when this ion current detecting circuit means is operated under normal condition, namely without under malfunction condition. However, when this circuit is brought into the malfunction condition, even when the ignition operation is performed under normal state, such an erroneous judgement is made in the case that the misfire happens to occur. Moreover, there is another problem that which circuit portion of the ion current detecting circuit means is under malfunction condition.

The present invention has been made to solve the above-described problems, and therefore, has an object to provide a combustion condition detecting apparatus equipped with a malfunction diagnosing apparatus capable of diagnosing malfunction of a detecting apparatus such as an ion current detecting circuit for detecting a combustion condition of an engine in a stage for detecting combustion conditions.

SUMMARY OF THE INVENTION

To achieve the above-described object, an engine combustion condition detecting apparatus equipped with a malfunction diagnosing apparatus, according to the present invention, is comprised of: a sensing circuit for sensing an ion current flowing through a combustion room; misfire judging means for judging misfire occurred in the engine in response to the detection signal derived from the sensing circuit; and further malfunction judging means for judging malfunction of the sensing circuit.

Also, as a preferable embodiment of the combustion condition detecting apparatus equipped with the malfunction diagnosing apparatus according to the present invention, when the misfire judging means judges that the misfire happens to occur, the malfunction judging means judges as to whether or not the misfire happens to occur by calculating a variation in revolution numbers for each of cylinders under a predetermined drive condition, whereby the malfunction of the sensing circuit is diagnosed. Furthermore, the malfunction judging means judges malfunction of an element employed in the sensing circuit based upon a mutual relationship between an input signal supplied to the sensing circuit and an output signal derived from the sensing circuit.

Also, as a preferable embodiment of the combustion condition detecting apparatus equipped with the malfunction diagnosing apparatus according to the present invention, the combustion condition detecting circuit is further comprised of monitoring/processing means; when the misfire judging means judges normal combustion, the monitoring/processing means forcibly stops an ignition signal under a predetermined drive condition to thereby induce misfire; the misfire judging means again judges as to whether or not the misfire happens to occur; and the malfunction judging means diagnoses the malfunction of the sensing circuit based on the judgement result of the misfire judging means. Furthermore, the combustion condition detecting circuit is further comprised of monitoring/processing means and external self-diagnosing means; when the misfire judging means judges normal combustion, the monitoring/processing means and the external self-diagnosing means forcibly stop an ignition signal under a predetermined drive condition to thereby induce misfire; the misfire judging means again judges as to whether or not the misfire happens to occur; and the malfunction judging means diagnoses the malfunction of the sensing circuit based on the judgement result of the misfire judging means.

The engine combustion condition detecting apparatus equipped with the malfunction diagnosing apparatus with the above-described arrangement, according to the present invention, is arranged by the malfunction judging means for judging the malfunction of the sensing circuit for detecting the ion currents within the combustion chambers. As a consequence, in such a case that since the sensing circuit is brought into the malfunction condition, the misfire judging means makes the erroneous judgement, the malfunction of the sensing circuit can be correctly detected.

Also, the malfunction judging means acquires both the input signal to the sensing circuit and the output signal from the sensing circuit, and diagnoses the malfunction of the sensing circuit based upon the mutual relationship between the input/output signals. The following malfunction of the circuit elements in the sensing circuit can be individually detected. That is, the charge capacitor, the zener diode, the diode, and the detecting resistor are opened, or shortcircuited.

Furthermore, the engine combustion condition detecting apparatus according to the present invention is further comprised of monitoring/processing means, the monitoring/processing means forcibly stops an ignition signal under a predetermined drive condition to thereby induce misfire. When the misfire judging means judges the normal combustion, the misfire judging means again judges as to whether or not the misfire happens to occur; and the malfunction judging means diagnoses the malfunction of the sensing circuit based on the judgement result of the misfire judging means.

Furthermore, the engine combustion condition detecting apparatus according to the present invention is further comprised of monitoring/processing means and external self-diagnosing means, the monitoring/processing means and the external self-diagnosing means forcibly stop an ignition signal under a predetermined drive condition to thereby induce misfire. When the misfire judging means judges the normal combustion, the misfire judging means again judges as to whether or not the misfire happens to occur; and the malfunction judging means diagnoses the malfunction of the sensing circuit based on the judgement result of the misfire judging means.

BRIEF DESCRIPTION OF THE DRAWINGS

For a more complete understanding of the present invention, reference is made of a detailed description to be read in conjunction with the accompanying drawings, in which:

FIG. 5 is a table for explaining malfunction conditions occurred when the ion current detecting circuit of FIG. 3 judges misfires;

FIG. 6 schematically represents malfunction conditions during normal judgement by the ion current detecting circuit of FIG. 3;

FIG. 10 is a table for illustratively showing failure detecting conditions of circuit elements employed in the ion current detecting circuit of FIG. 3.

DESCRIPTION OF THE PREFERRED EMBODIMENTS

Referring now to drawings a description will be made of an engine combustion condition detecting apparatus equipped with a malfunction (failure) diagnosing apparatus, according to an embodiment of the present invention.

Figure 1:
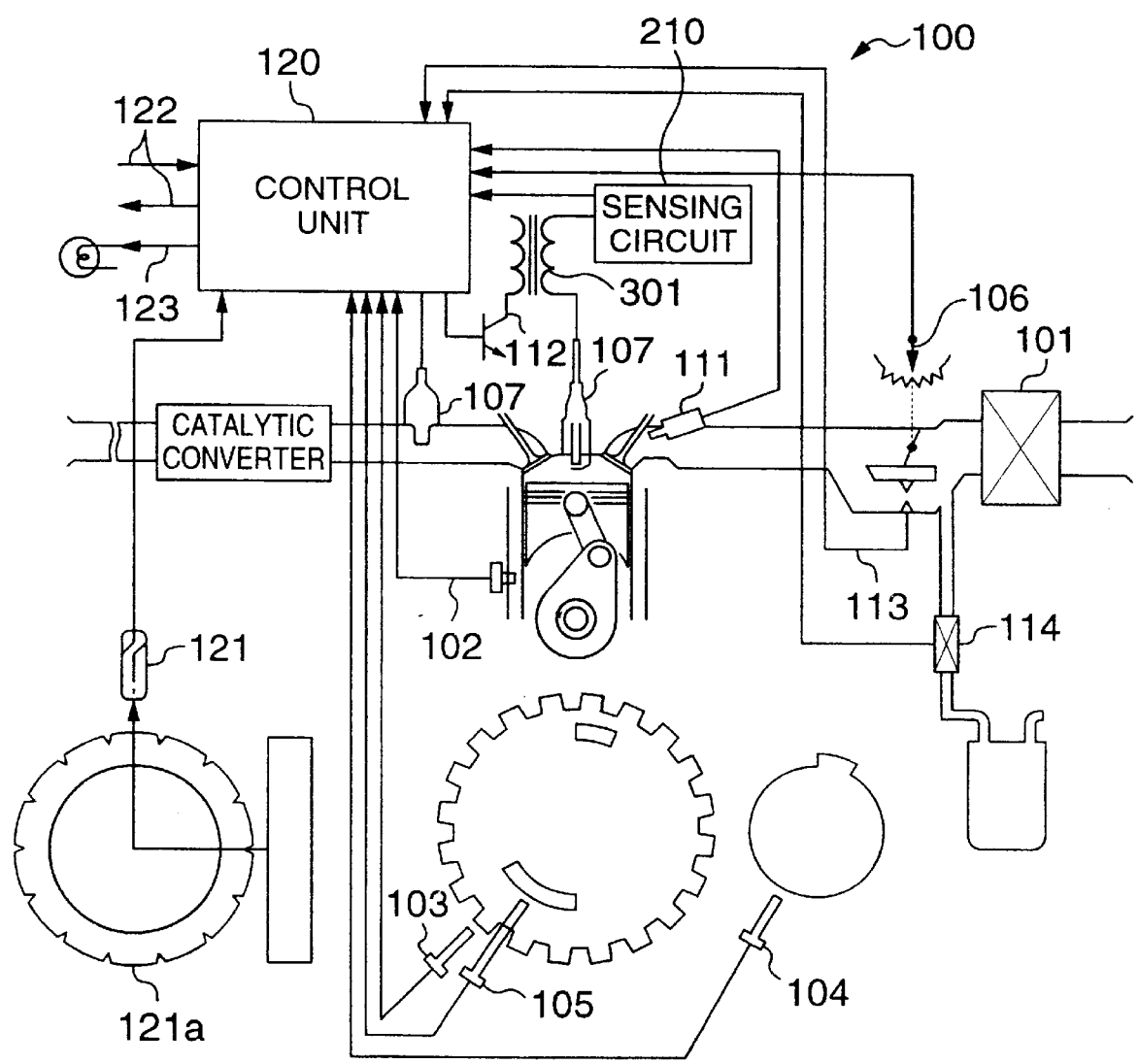
FIG. 1 is an overall structural diagram for schematically showing an engine installed with an engine combustion condition detecting apparatus equipped with a malfunction diagnosing apparatus, according to an embodiment mode of the present invention.

FIG. 1 schematically represents an overall arrangement of a control system for an engine installed with an engine combustion condition detecting apparatus equipped with a malfunction diagnosing apparatus, according to this embodiment of the present invention.

An actuator for controlling output power of an engine 100 and various sorts of sensors for detecting drive conditions is mounted on this engine 100.

As these various sorts of sensors, the following sensors are mounted on this engine 100. That is, there are an intake air flow meter 101 for measuring an intake air flow of the engine 100; a coolant temperature sensor 102 for measuring a temperature of cooling water of the engine 100; a crank angle sensor 103 for measuring a crank angle; a phase sensor 104 for discriminating a cylinder; a reference sensor 105 for indicating a specific crank angle; a throttle sensor 106 for measuring an angle of a throttle valve; an $O_2$ sensor, or air fuel ratio sensor 107 for measuring $O_2$ concentration of exhaust gas, and so on.

Also, as the actuators, there are provided an injector 111 for controlling a fuel amount; an igniter 112 for controlling ignition; an idling speed control valve 113 for controlling an intake air amount during idling operation; a purge valve 114 for controlling a purge amount from a canister; and so on.

Furthermore, an engine control unit 120 is provided on the above-described engine 100. The above-described various sensors and various sorts of actuators are connected to this engine control unit 120. In response to the values sensed by the various sorts of sensors, the engine control unit 120 may control actuation amounts of the various sorts of actuators. A sensing circuit (ion current detecting circuit) 210 is connected to a secondary circuit side of an ignition coil 301 of an ignition plug 108 employed in the engine 102. An output circuit side of this sensing circuit 210 is connected to the engine control unit 120.

Then, the engine control unit 120 counts a quantity of pulses derived from the crank angle sensor 103 within a predetermined time period so as to measure the number of revolutions of the engine 100, and also calculates a load given to the engine 100 based on an intake air amount. The engine control unit 120 also acquires rotation numbers of a wheel 121a of an automobile, or a vehicle from a rotation number sensor 121 in order to input therein a vehicle speed (VSP).

Also, the engine control unit 120 is internally equipped with a combustion condition detecting apparatus (will be discussed in detail) for the engine 100, and also equipped with a terminal 122 of an external self-diagnosing apparatus capable of stopping the fuel injection and ignition of the engine 100 with respect only to a specific cylinder.

A warning lamp 123 is arranged in such a manner that since this warning lamp 123 is turned ON in response to the detection result derived from the combustion condition detecting apparatus, this warning lamp 123 may warn a driver of the vehicle. At the same time, this warning lamp 123 may be arranged to indicates such a warning information an a self-diagnostic function tester.

Figure 2:
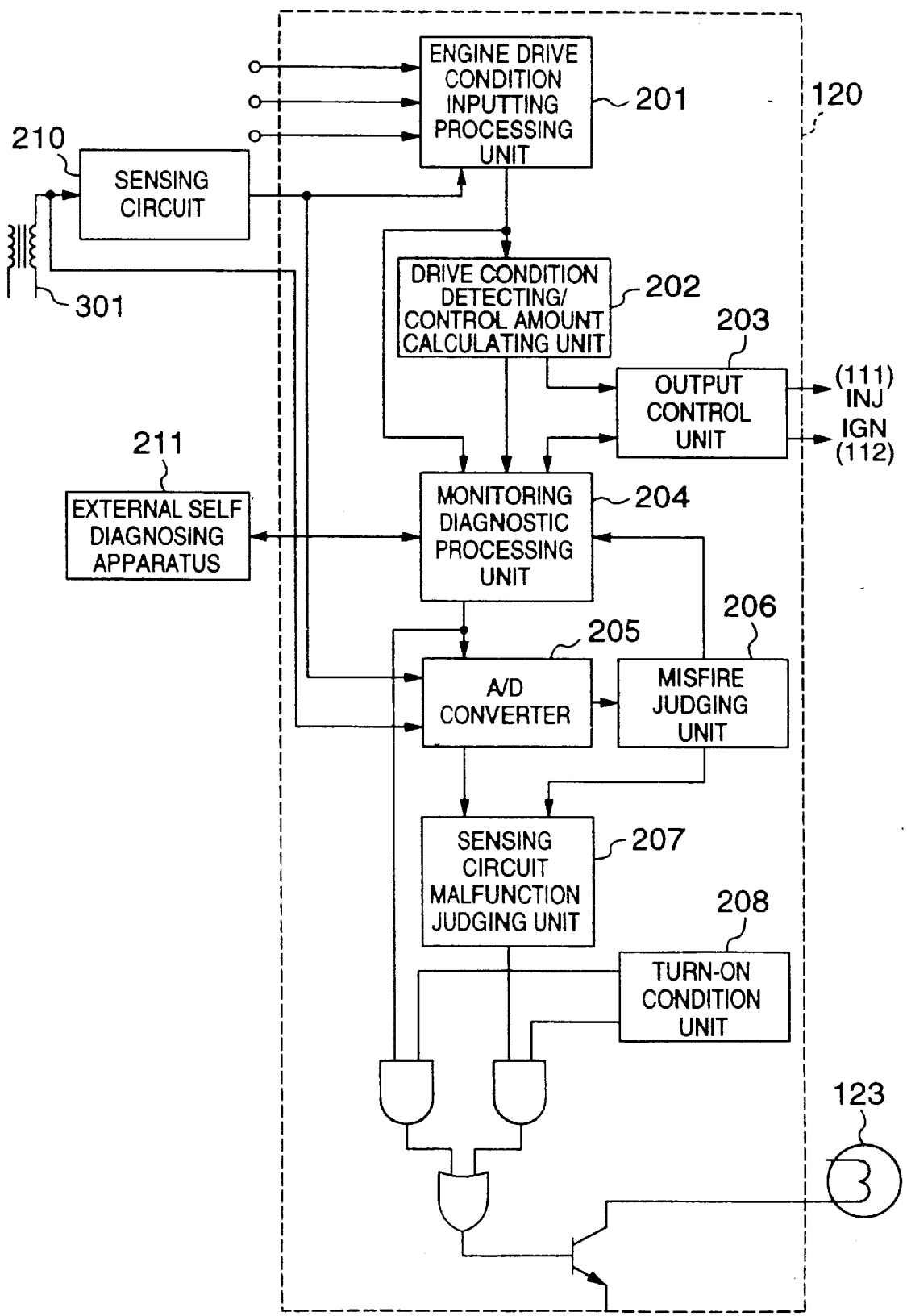
FIG. 2 schematically represents a control block diagram of the engine combustion condition detecting apparatus equipped with the malfunction diagnosing apparatus shown in FIG. 1.

FIG. 2 schematically indicates a control block diagram of the engine control unit 120 containing the combustion condition detecting apparatus according to this embodiment mode. The engine control unit 120 includes a microcomputer.

The engine control unit 120 is internally provided with engine drive condition inputting/processing unit 201; drive condition detecting/control amount calculating unit 202; output control unit 203; monitoring/diagnostic processing unit 204 for input/output of drive condition; A/D converter 205 for an ion current; misfire judging unit 206; sensing circuit malfunction judging unit 207; and a turn-on condition unit 208.

The engine drive condition inputting/processing unit 201 inputs/processes sensor signals via either the A/D converter or a period measuring means, and these sensor signals are derived from the various sorts of sensors mounted on the engine 100, such as the intake air flow meter 101, the coolant temperature sensor 102, the crank angle sensor 103, the phase sensor 104, the reference sensor 105, the throttle sensor 106, and the 02 sensor.

Also, the detections of the combustion conditions within the combustion chambers of the engine 100 imply that ion currents are detected which are produced during the combustion within the combustion chambers of the engine 100. The measurement of the ion currents is carried out in the sensing circuit unit (ion current detecting unit) 210. An output signal of this sensing circuit unit 210 is entered into the drive condition inputting/processing unit 201, and on the other hand, is connected via the A/D converter 205 to the misfire judging unit 206.

In the engine drive condition detecting/control amount calculating unit 202, a load factor of the engine 100 and a necessity of fuel cutting are calculated based on the input signals from the various sorts of sensors, and further control parameters such as a fuel injection amount and a ignition timing are calculated. The output control unit 203 converts the fuel jetting amount into an actual fuel injection time width so as to drive the injector 111. Also, this output control unit 203 sets ignition timing based on the crank angle and time sensed from the reference sensor 104 to thereby output this set ignition timing to the ignition plug 115.

Based upon the value of the ion current derived from the sensing circuit unit 210, the misfire judging unit 206 judges the drive condition of the engine, namely judges as to whether or not a misfire happens to occur in each of the cylinders in the engine 100. Then, this misfire judging unit 206 outputs the output signal of this judgement result to the monitoring/processing unit 204 and to the malfunction judging unit 207 of the sensing circuit.

The monitoring/diagnostic processing unit 204, monitors a relationship between the drive conditions and control amounts of the engine 100 in response to the output signals derived from the various sorts of sensors, and also the output signal derived from the misfire judging unit 206 so as to continuously perform the monitoring/diagnostic process capable of detecting abnormal conditions of the various sensors and also the abnormal contents of the control operations. The monitored result may cause the output control unit 203 to give influences to the output controls, for instance, the fuel cutting control. Also, this monitoring/diagnostic processing unit 204 may be arranged in such a manner that an output signal is produced from the output control unit 203 in response to a mutual communication signal between the above-described output signals and the output signal from the external self-diagnosing apparatus 211 externally provided with the engine control unit 120.

In the sensing circuit malfunction judging unit 207, the malfunction of the sensing circuit 210 for the engine 100 is diagnosed. This malfunction diagnosing operation by the sensing circuit malfunction judging unit 207 may be carried out as follows. In response to either a preselected drive condition or the signal derived from the external self-diagnosing apparatus 211, this sensing circuit malfunction judging unit 207 judges as to whether or not an abnormal operation happens to occur in the detection circuit of the sensing circuit unit 210, and also as to whether or not the internal component is opencircuited, or shortcircuited by considering the relationship between the judgement result of the combustion condition in the misfire judging unit 206, and other drive conditions. When this sensing circuit malfunction judging unit 207 detects that the abnormal operation happens to occur, this detection signal is compared with the output signal derived from the turn-ON condition 208 to thereby turn ON the warning lamp 123, so that the driver of the vehicle is required to repair this malfunction.

Also, in order to diagnose failures of the respective circuit elements provided in the sensing circuit 210, the ion current appearing on the input side of the sensing circuit 210 is entered via the A/D converter 205 to the malfunction judging unit 207 of the sensing circuit. Since both this input signal and the output signal of the sensing circuit 210 are additionally supplied to the malfunction judging unit 207, the failures of the circuit elements themselves provided in the sensing circuit 210 are detected.

Figure 3:
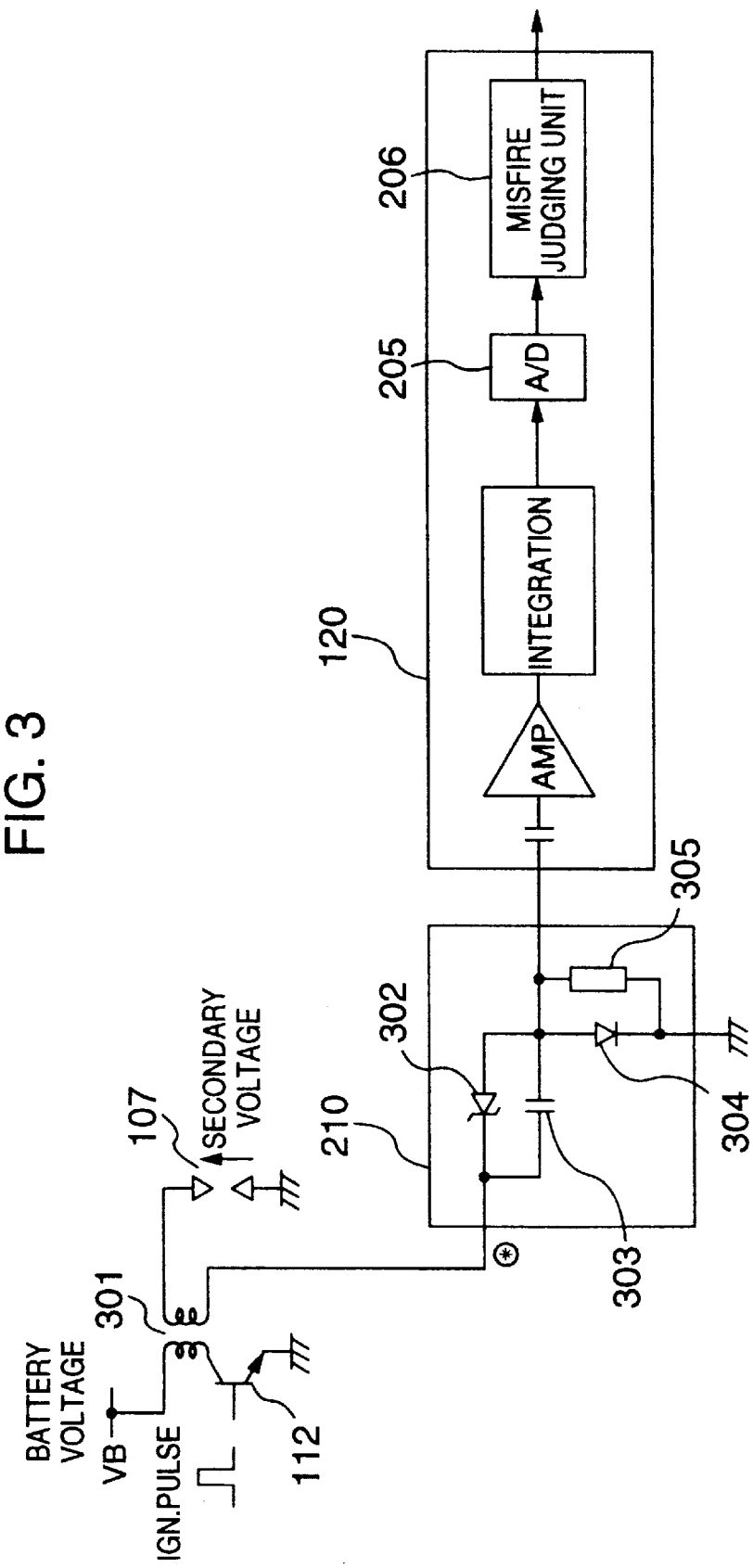
FIG. 3 indicates an ion current detecting circuit (sensing circuit) employed in the engine combustion condition detecting apparatus equipped with the malfunction diagnosing apparatus shown in FIG. 2.

FIG. 3 represents the sensing circuit (ion current detecting circuit) 210 for measuring the ion current.

Within the combustion chambers of the engine 100, combustion gas is ionizable to generate ions due to high-temperature heats produced during combustion operations. When a potential is produced within this combustion chamber, plus ions are attracted to a minus polarity side whereas minus ions are attracted to a plus polarity side. As a result, these ions may be detected as a current which is direct proportional to an amount of ions.

A circuit arrangement made of a zener diode 302, a charge capacitor 303, a diode 304, and a detecting resistor 305 is interposed between the ground and a terminal on a cold side in the secondary winding side of the ignition coil 301. The terminal VB of the primary winding of the ignition coil 301 is connected to the battery voltage terminal (a hot side).

Figure 4:
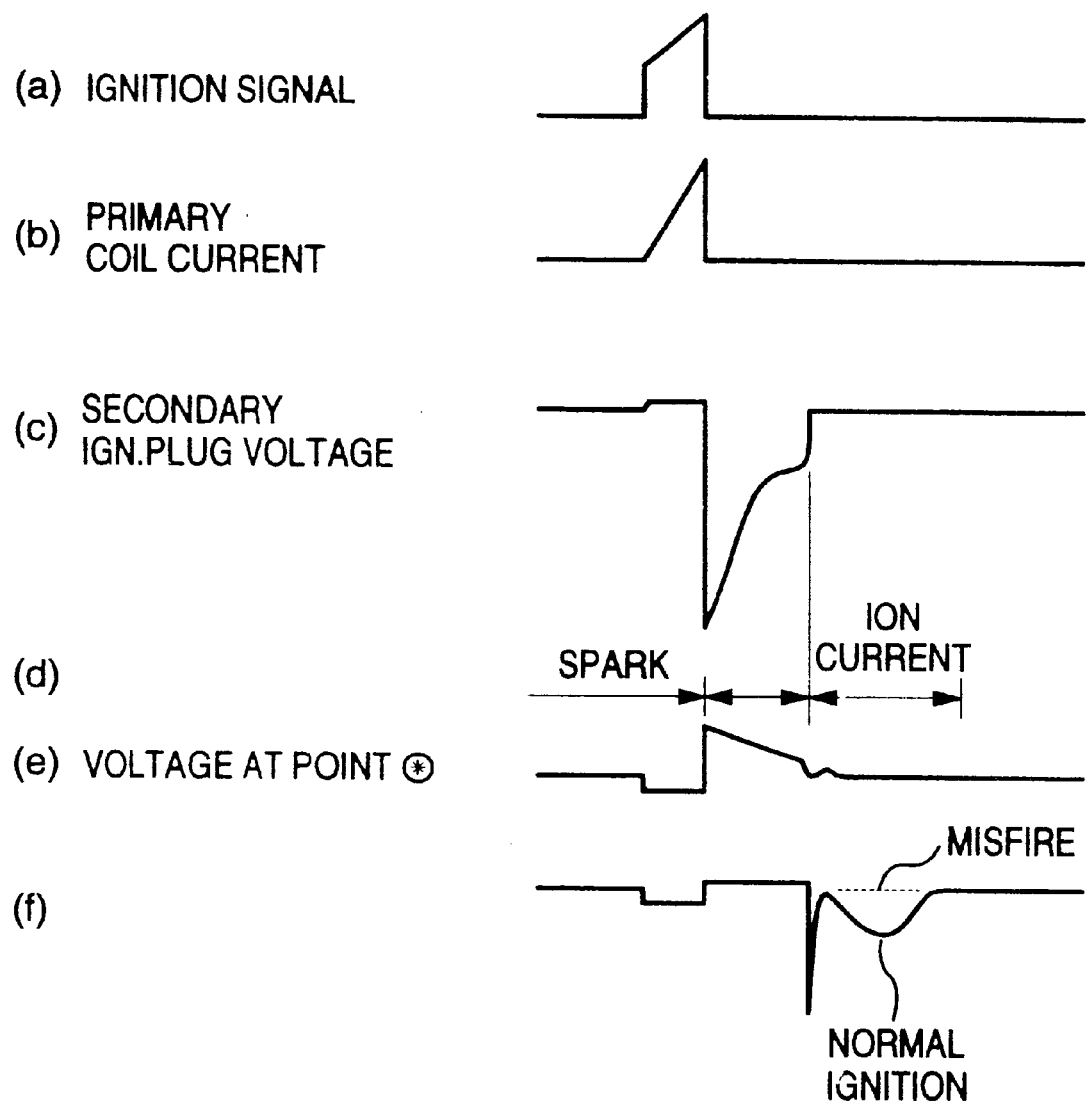
FIG. 4 is an explanatory diagram for explaining operations of the ion current detecting circuit shown in FIG. 3.

Referring now to FIG. 3 and FIG. 4, operations of the sensing circuit (ion current detecting circuit) for measuring the above-described ion current will be explained. When an ignition signal (see FIG. 4, (*a*)) is applied to the ignitor 112 of the engine 100, a current (see FIG. 4, (*b*)) starts to flow through the ignition coil of the primary winding side of the ignition coil 301. When this ignition signal is returned to zero after a preselected energizing time period has passed, the current flowing through the ignition coil of the primary winding side. The energy stored in the ignition coil 310 may produce a high voltage (see FIG. 4, (*c*)) across the secondary winding coil, and then this high voltage may produce spark (see FIG. 4, (*d*)) at the ignition plug 115, so that the combustion of the engine is commenced.

The charge capacitor 303 is charged by the current flowing when the spark is generated, and this charging operation is continued until the charged voltage becomes a zener voltage (see FIG. 4, (e)) of the zener diode 302. When the spark disappears, the charge current becomes zero. However, the voltage applied to the charge capacitor 303 is applied to the ignition plug 107, so that a discharge current may flow through the ignition coil 301 and the peripheral portion of the ignition plug 115. Thereafter, such an ion current (see FIG. 4, (f)) flows which is directly proportional to an amount of ions existing in the combustion chamber. Thus, the combustion conditions can be grasped by integrating this ion current by the engine control unit 120.

When misfire happens to occur, since no combustion is made, ions are not generated, so that a waveform corresponding to an ion current is not produced (namely, dotted line of FIG. 4, (f)) from the ion current detecting circuit 210. Conversely, when combustion is normally carried out, an ion current waveform (namely, solid line of FIG. 4, (f)) is produced. As a consequence, the misfire judging unit 206 can judge as to whether the normal combustion is made, or the misfire happens to occur by judging as to whether or not the ion current waveform is present. In other words, while the discharge start timing is set as the start trigger, the output signal from the ion current detecting circuit 210 is acquired by the misfire judging unit 206 employed in the engine control unit 120 after a predetermined time period has passed. Then, this output signal is compared with a threshold value. If this output signal is smaller than, or equal to the threshold value, then, the misfire judging unit 206 judges that the misfire happens to occur.

FIG. 5 is a table for representing malfunction (failure) conditions of circuit elements employed in the ion current detecting circuit unit (sensing circuit unit) 210. The judgements of these element malfunction conditions are carried out in the malfunction judging unit 207 of the sensing circuit. Other than these element malfunction conditions, this malfunction judging unit 207 judges that misfire happens to occur irrelevant to the combustion conditions in such a case that the input line of the ion current detecting circuit unit 210 is disconnected, VB-shortcircuits, or ground-shortcircuited. The VB-shortcircuit means that a terminal of sensor or circuit is short-circuited to the VB terminal (battery voltage line). The ground-shortcircuit means that a terminal of sensor or circuit is short-circuited to the ground line.

Also, if the trigger signal, or the integration circuit for detecting the ion current is not present, then the output signal becomes zero, which implies that the misfire similarly happens to occur. Even when the output of the ion current detecting unit 210 is ground-shortcircuited, it may be judged that the misfire happens to occur. The malfunction judging unit 207 may judge that the misfire always happens to occur even when the charge capacitor 303 is opened, or shortcircuits, and further the zener diode 302 is shortcircuited, and also either the diode 304 or the detecting resistor 305 is shortcircuited. In the case that the malfunction judging unit 207 detects the occurrence of the misfire irrelevant to the combustion condition, the malfunction judging unit 207 discriminates this misfire from the failure condition of the circuit, compared with the drive condition of the engine.

As shown in FIG. 6, if the malfunction judging unit 207 judges the occurrence of the misfire though the time interval of the sensor signal outputted from the reference sensor 105 is constant and further the engine revolutions are under normal condition, this malfunction judging unit 207 judges that the ion current detecting circuit unit 210 malfunctions. On the other hand, when the output of the ion current detecting circuit unit 210 is VB-shortcircuited, this output is continuously increased larger than, or equal to a threshold value. Thus, this condition is judged as the normal combustion. Also, in such a case that the zener diode 302 is opened, the diode 304 is opened, and the detecting resistor 305 is opened in the ion current detecting circuit unit 210, since the outputs from this ion current detecting circuit unit 210 are increased, these conditions are judged as the normal combustion even if the drive condition is brought into the misfire condition.

In the case that the normal combustion is detected under such a drive condition that the misfire surely occurs, it is recognized that the ion current detecting circuit unit 210 is brought into the malfunction condition. For instance, if the normal combustion is detected while the fuel supply is cut from the high engine speed, then this condition is so judged as the malfunction of the ion current detecting circuit unit 210.

In the case that even if the ignition operation is stopped, this condition is judged as the normal combustion, it is predictable that at least the harness is possibly VB-shortcircuited. As the possible drive conditions under which the ignition operation is stopped, there are the above-described fuel supply cutting operation, and also tests executed in a repair factory where exhaust gas of an automobile can be properly processed.

In this case, a fuel injection from a specific cylinder may be performed, and ignition operation may be stopped, and further the malfunction judging unit may judge as to whether or not misfire happens to occur by combining input signals with each other, derived from the terminals of the external self-diagnosing apparatus 211, or combining the communication signals with each other, derived from the self-diagnosing tester.

Figure 7:
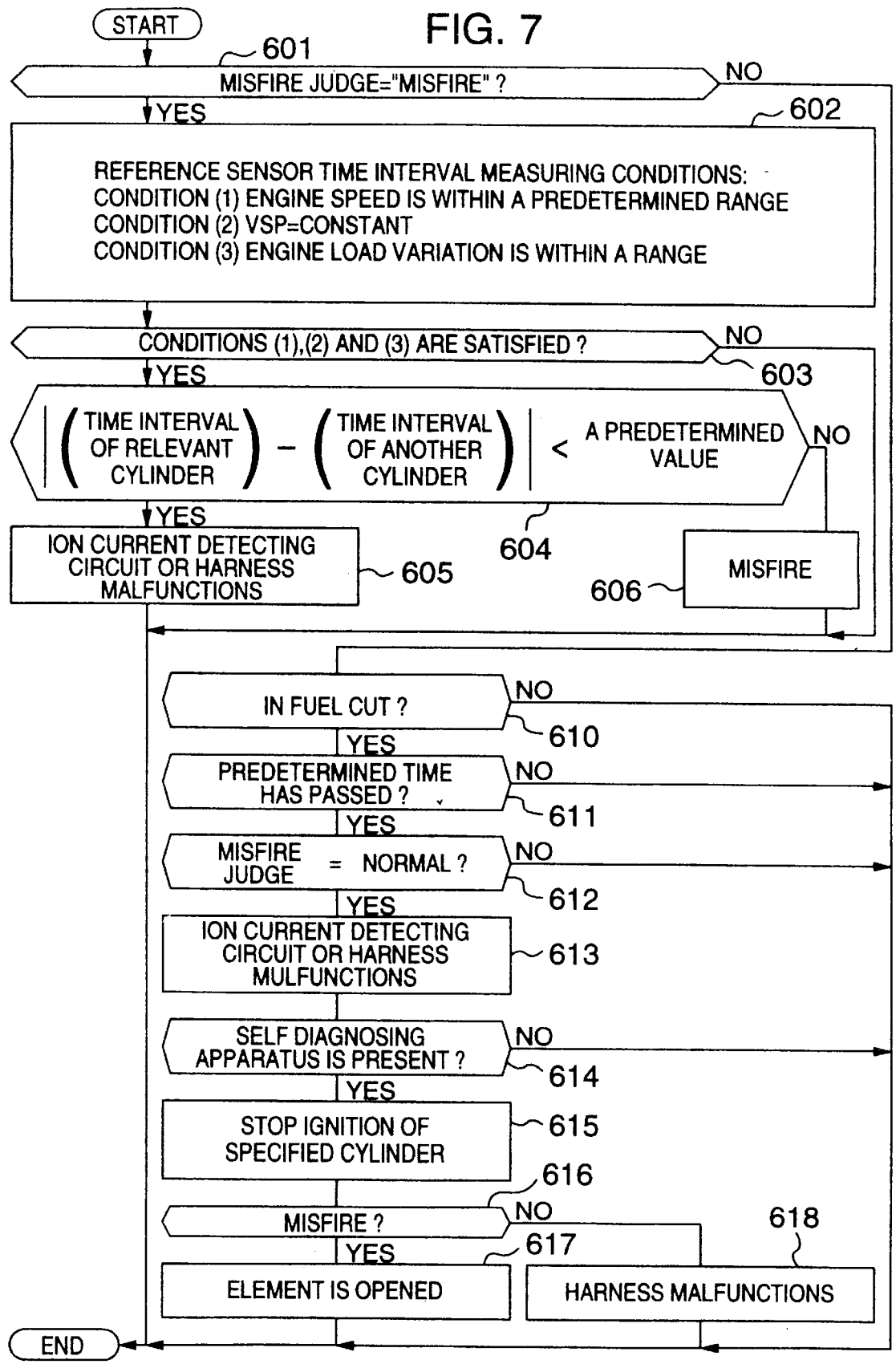
FIG. 7 is a flow chart for describing a malfunction diagnosing operation by the engine combustion condition detecting apparatus equipped with the malfunction diagnosing apparatus shown in FIG. 2.

FIG. 7 is a flow chart for describing malfunction diagnosing operations. First, at a step 601, a current misfire judgement is fetched so as to judge as to whether or normal combustion judgement, or the misfire judgement is made.

If the normal combustion is judged, then the process operation is advanced to flow operations defined after a step 610. If the occurrence of the misfire is judged, then the process operation is advanced to a step 602 at which the time interval of the sensor signals from the reference sensor 105 is measured. Then, the process operation is advanced to a step 603.

At this step 603, the time interval measuring condition of the reference sensor 105 is checked. In other words, such a judgement is made as to whether or not the present drive condition becomes such a stable condition that while the engine speed is within a preselected value range, there is substantially no variation in the vehicle speed (VSP) and the engine load.

At a further step 604, when a predetermined condition is satisfied, the reference sensor interval of the cylinder where the occurrence of the misfire is detected is compared with the reference sensor interval of another cylinder. If a difference between these intervals is smaller than, or equal to a preselected value, then the process operation is advanced to a step 605. At this step 605, the following judgement is made. The engine itself is not brought into the misfire condition, but either the ion current detecting circuit or the harness is brought into the malfunction condition. Conversely, when the difference between the intervals is larger than, or equal to a predetermined value, the process operation is advanced to a step 606 at which it is so judged hat the misfire happens to occur in the engine.

A process operation defined from a step 610 to a step 618 corresponds to a flow operation in the case that an engine condition is judged as the normal combustion, namely is used to judge combustion conditions of the engine.

At a first step 610, a judgement is made as to whether or not the engine combustion condition corresponds to the fuel supply cutting condition. If this engine combustion condition corresponds to the fuel supply cutting condition (fuel cut), then the process operation is advanced to a step 611. At this step 611, the duration time of this fuel supply cutting operation is measured. Thereafter, the waiting condition is continued until a preselected time period has passed. After this preselected time period has passed, the process operation is advanced to a step 612. At this step 612, the output derived from the ion current detecting circuit unit 210 is acquired. If it is so judged that the engine combustion condition is still under normal combustion condition, then the process operation is advanced to a step 613. At this step 613, it is so judged that the ion current detecting circuit 210 is brought into the malfunction, or the harness is troubled.

At a step 614, a check is made as to whether or not there is such a signal produced from the external self-diagnosing apparatus of the engine control apparatus. If there is such a signal, then the process operation is advanced to a step 615 at which the below-mentioned diagnosing operations are carried out in a facility where the exhaust gas is properly processed.

That is, when an instruction to stop the ignition operation is issued by combining the external signals with each other, or by combining the external signals with the signal derived from the self-diagnosing apparatus, the process operation is advanced to a step 615. At this step 615, the ignition operation of the cylinder instructed at the previous step 614 is stopped.

In such a case that even when the ignition operation of the designated cylinder is stopped, the output signal from the ion current detecting circuit is judged as the normal combustion (namely, no misfire), the process operation is advanced to a step 618 at which this condition is judged as the harness failure. Conversely, when it is so judged that the misfire happens to occur at the step 616, the process operation is advanced to a step 617. At this step 617, it is so judged that the element employed in the ion current detecting circuit is opened. It is alternatively possible to cut the supply of fuel at the same time, depending upon a combination of signals, so that exhaust gas gives no adverse influence a peripheral environment.

Figure 8:
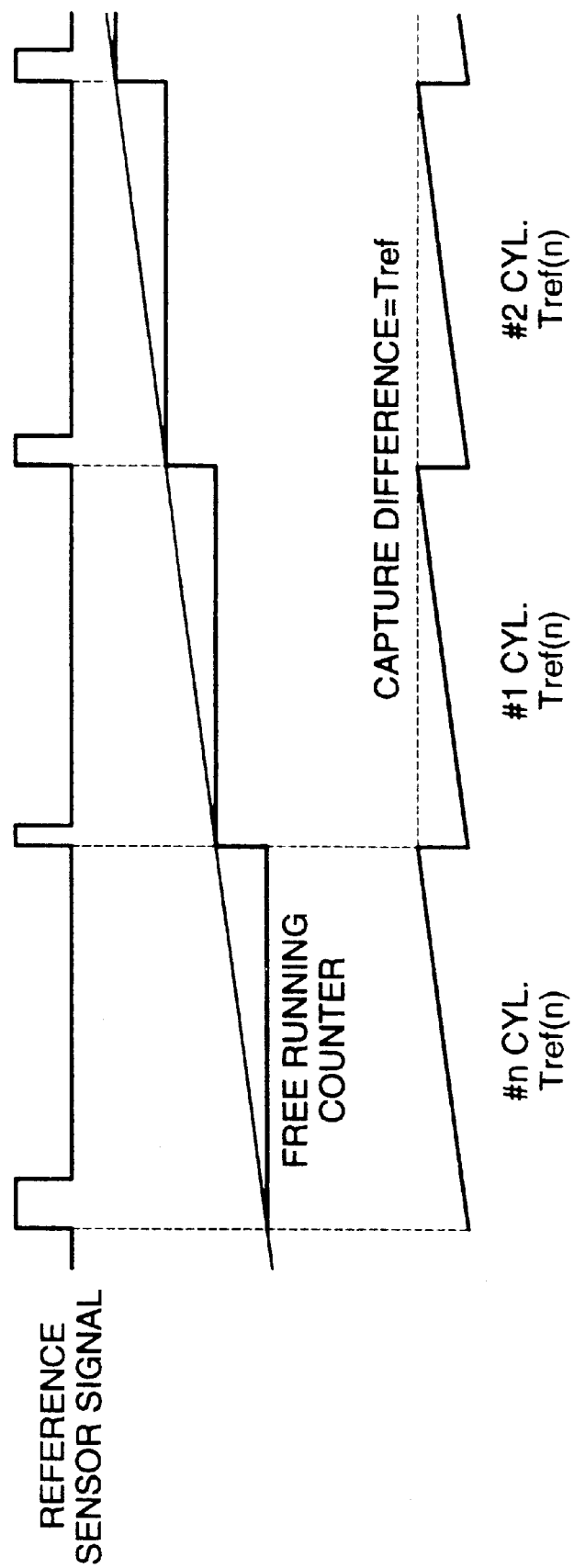
FIG. 8 indicates a timing chart (1) for explaining malfunction diagnosing operation of FIG. 7.

FIG. 8 represents a timing chart for explaining the flow operations defined from the above-described steps 600 to 606. When the combustion condition becomes stable, a signal interval Tref of a reference sensor signal is measured. This signal interval Tref is equal to a time interval defined from one rising edge of a reference sensor signal to the next rising edge of the reference sensor signal. This signal interval is defined by capturing a free-running counter to calculate a difference between the presently captured value and the previously captured value. If the free-running counter is initialized to zero by the capture, then the captured value itself becomes a time difference.

The signal interval Tref is measured with respect to each of the cylinders, and then interval differences among the cylinders are calculated. The interval differences may be simply calculated from differences. Alternatively, if the interval differences are calculated from the data of the plural cylinders, then the adverse influences of the revolution variations of other cylinders can be reduced.

When the interval difference is smaller than, or equal to a predetermined value, the engine 100 is driven under normal condition. Even if it is so judged that the misfire happens to occur, then either the harness or the ion current detecting circuit means 210 is brought into the malfunction condition.

When the malfunction conditions are detected one time or continuously detected more than one time, the warning lamp 123 of the engine control unit 120 is turned ON, which may instruct the automobile driver to replace the ion current detection module at an earlier stage.

Figure 9:
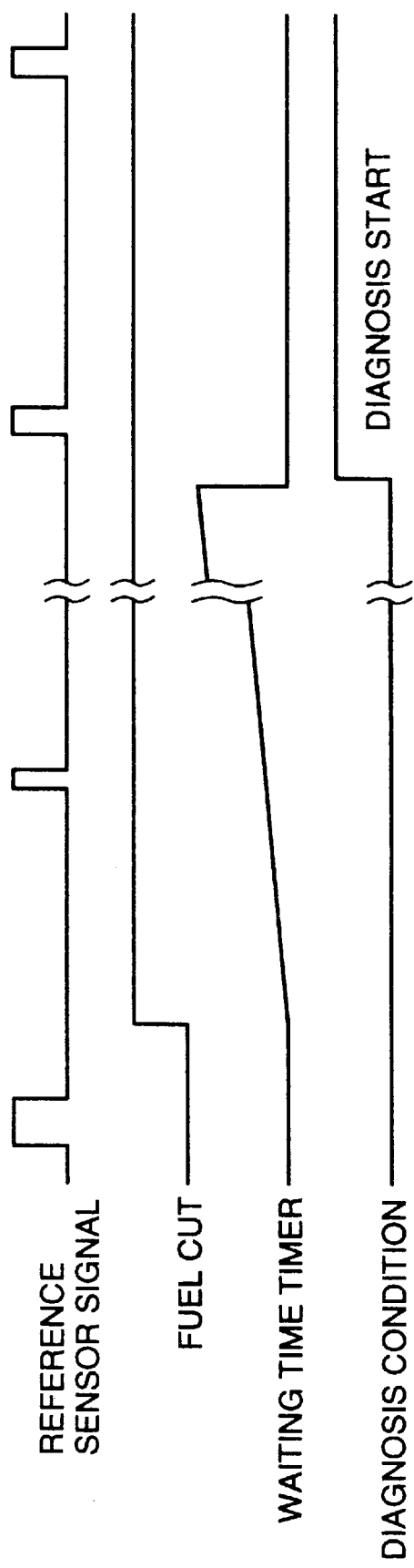
FIG. 9 indicates a timing chart (2) for explaining malfunction diagnosing operation of FIG. 7.

FIG. 9 shows a timing chart for explaining the flow operation defined from the above-described steps 610 to 618.

A fuel-supply cutting flag under engine control is checked. If the fuel supply is cut, then a waiting time timer is initiated. If the fuel supply is not cut, then the waiting time timer is set to an initial value thereof. When the waiting time timer reaches a preselected value, the output of the ion current detecting circuit unit 210 is monitored. Even in this condition, when it is so judged as the normal combustion, then either the harness or the ion current detecting circuit unit 210 is brought into the malfunction condition.

When the malfunction conditions are detected one time or continuously detected more than one time, the warning lamp 123 of the engine control unit 120 is turned on, which may instruct the automobile driver to replace the ion current detection module at an earlier stage.

FIG. 10 is a table for explaining judgements of element failures within the ion current detecting circuit unit 210.

The ion current detecting circuit unit 210 employs four elements. There is a problem in the above-described diagnosing unit such that the element under failure state cannot be specified. To avoid this problem, a monitor circuit for monitoring an input and an output of a circuit is additionally provided to detect an element failure.

Reference numeral 901 of FIG. 10 indicates such a malfunction case that an input signal is different from an output signal, and a voltage equal to the zener voltage of the zener diode 304 appears in the input signal. This failure implies that the charge capacitor 303 is opened. If the output signal becomes constant, i.e., zero, then either the diode or the detecting resistor is shortcircuited. In this malfunction case, no discrimination is made, namely either the diode is shortcircuited, or the detecting resistor is shortcircuited.

Reference numerals 902 and 904 indicate such a malfunction case that if the input signal is identical to the output signal, and the integrated output from the ion current detecting circuit unit 210 becomes zero, the zener diode 302 is shortcircuited, or the charge capacitor 303 is shortcircuited. Also, in this malfunction case, no discrimination is made, namely either the zener diode 302 is shortcircuited, or the charge capacitor 303 is shortcircuited.

Reference numeral 903 indicates such a failure case that the signal for charging the output signal along the minus direction is integrated, and thus the zener diode 303 is opened. It should be noted that reference numeral 903 indicates such a malfunction case that the high voltage generated at the secondary winding side of the ignition coil is repeatedly applied to the charge capacitor 303 even in the instantaneous manner. As a result, there is a problem in the withstanding voltage of the charge capacitor 303. Also, since a high voltage spike is applied during the measurement of the input signal, it is preferable that A/D inputs are protected.

In the case that two sets of ignition coils are measured by one set of such an ion current detecting circuit unit 210, since ignition operation is carried out via another ignition coil, the same operation as that of the simultaneous ignition mode is performed. As a result, although the ignition voltages are lowered, there is no adverse influence in the ignition performance.

Reference numeral 906 indicates such a malfunction case that when the output signal becomes plus, the zener diode 302 is opened. Reference numerals 906 and 908 are such malfunction cases that when the output signals are zero, either the zener diode 302 is shortcircuited, or the detecting resistor 305 is shortcircuited.

Reference numeral 907 indicates such a malfunction case that when the output signal becomes minus, especially when the ignition signal is commenced, the detecting resistor 305 is opened.

While one embodiment mode of the present invention has been described in detail, the present invention is not limited to the above-described embodiment mode, but may be modified, or changed without departing from the technical spirit/scope of the present invention defined in the pending claims thereof.

As apparent from the above-described explanations, since the engine combustion condition detecting apparatus equipped with the malfunction diagnosing apparatus, according to the present invention, is comprised of the sensing circuit malfunction judging unit for detecting the ion currents flowing through the combustion chambers, the malfunction of this sensing circuit can be diagnosed on the board.

Also, the malfunction judging unit can detect the failures of the respective elements employed in the sensing circuit based upon the input signal supplied to the sensing circuit, and also the output signal derived from this sensing circuit.

Furthermore, the ignition signal is forcibly stopped under a preselected drive condition by the monitoring/processing unit so as to induce the misfire. As a consequence, when the misfire judging unit judges the normal combustion, the misfire is induced. This misfire judging unit again judges as to whether or not the misfire happens to occur. As a result, the misfire judging unit can diagnose as to whether or not the sensing circuit is brought into the malfunction condition.

What is claimed is:

1. An engine combustion detecting apparatus comprising:
   a sensing circuit for sensing an ion current flowing through a combustion chamber;
   misfire judging means for judging occurrence of misfire in the engine in response to a detection signal derived from said sensing circuit; and
   malfunction judging means for judging malfunction of said sensing circuit.

2. An engine combustion detecting apparatus as claimed in claim 1, wherein
   when said misfire judging means judges that the misfire happens to occur, said malfunction judging means judges as to whether or not the misfire happens to occur by calculating a variation in number of revolution for each of cylinders under a predetermined drive condition, whereby the malfunction of said sensing circuit is diagnosed.

3. An engine combustion detecting apparatus as claimed in claim 1, wherein
   said malfunction judging means judges malfunction of an element employed in the sensing circuit based upon a mutual relationship between an input signal supplied to said sensing circuit and an output signal derived from said sensing circuit.

4. An engine combustion detecting apparatus as claimed in claim 1, wherein
   said combustion condition detecting circuit is further comprised of monitoring/processing means;
   when said misfire judging means judges normal combustion, said monitoring/processing means forcibly stops an ignition signal under a predetermined drive condition to thereby induce misfire; said misfire judging means again judges as to whether or not the misfire happens to occur; and said malfunction judging means diagnoses the malfunction of said sensing circuit based on the judgement result of said misfire judging means.

5. An engine combustion detecting apparatus as claimed in claim 1, wherein
   said combustion condition detecting circuit is further comprised of monitoring/processing means and external self-diagnosing means;
   when said misfire judging means judges normal combustion, said monitoring/processing means and said external self-diagnosing means forcibly stop an ignition signal under a predetermined drive condition to thereby induce misfire; said misfire judging means again judges as to whether or not the misfire happens to occur; and said malfunction judging means diagnoses the malfunction of said sensing circuit based on the judgement result of said misfire judging means.

* * * * *